(12) United States Patent
Raghoebardayal et al.

(10) Patent No.: US 9,465,436 B2
(45) Date of Patent: *Oct. 11, 2016

(54) SYSTEM AND METHOD OF IMAGE RECONSTRUCTION

(71) Applicant: Sony Computer Entertainment Europe Limited, London (GB)

(72) Inventors: Sharwin Winesh Raghoebardayal, London (GB); Simon Mark Benson, London (GB); Ian Henry Bickerstaff, London (GB)

(73) Assignee: Sony Computer Entertainment Europe Limited (GB)

(*) Notice: Subject to any disclaimer, the term of this patent is extended or adjusted under 35 U.S.C. 154(b) by 275 days.

This patent is subject to a terminal disclaimer.

(21) Appl. No.: 14/073,087

(22) Filed: Nov. 6, 2013

(65) Prior Publication Data

US 2014/0132603 A1    May 15, 2014

(30) Foreign Application Priority Data

Nov. 9, 2012 (GB) .................................. 1220219.8

(51) Int. Cl.
G06T 17/00 (2006.01)
G06F 3/01 (2006.01)
(Continued)

(52) U.S. Cl.
CPC .............. G06F 3/012 (2013.01); A63F 13/10 (2013.01); A63F 13/212 (2014.09); G06T 15/04 (2013.01); G06T 17/00 (2013.01); G06T 17/20 (2013.01); G06T 19/006 (2013.01); H04N 13/0022 (2013.01); H04N 13/0271 (2013.01);
(Continued)

(58) Field of Classification Search
None
See application file for complete search history.

(56) References Cited

U.S. PATENT DOCUMENTS 6,084,979 A * 7/2000 Kanade .............. H04N 13/0022
345/424
6,208,348 B1   3/2001 Kaye
(Continued)

FOREIGN PATENT DOCUMENTS

| EP | 2568355 A2 | 3/2013 |
| WO | 2008026141 A2 | 3/2008 |
| WO | 2012084277 A1 | 6/2012 |

OTHER PUBLICATIONS

Ju, Xiangyang, et al. "Integration of range images in a multi-view stereo system." Pattern Recognition, 2004. ICPR 2004. Proceedings of the 17th International Conference on. vol. 4. IEEE, 2004.*
(Continued)

*Primary Examiner* — Sultana M Zalalee
(74) *Attorney, Agent, or Firm* — Lerner, David, Littenberg, Krumholz & Mentlik, LLP (57) ABSTRACT

A method of image reconstruction is provided. The method includes capturing a stereoscopic pair of images of a scene, generating a disparity map for the pair of images, and defining a series of value ranges corresponding to disparity with each value range in the series having an end point corresponding to a greater disparity than an end point of preceding value ranges in the series. For each value range in the series, and progressing in order through the series from the first value range in the series, the method includes selecting points in the disparity map falling within the respective value range and generating a mesh responsive to those selected points. The method also includes subsequently merging the series of generated meshes to form a 3D model of the scene.

15 Claims, 6 Drawing Sheets

(51) Int. Cl.

| | | |
|---|---|---|
| *G06T 15/04* | (2011.01) | |
| *H04N 13/02* | (2006.01) | |
| *H04N 13/00* | (2006.01) | |
| *G06T 17/20* | (2006.01) | |
| *G06T 19/00* | (2011.01) | |
| *A63F 13/40* | (2014.01) | |
| *A63F 13/212* | (2014.01) | |

(52) U.S. Cl.
CPC ....... *H04N13/0278* (2013.01); *A63F 2300/69* (2013.01); *A63F 2300/695* (2013.01); *H04N 2013/0081* (2013.01)

(56) References Cited

U.S. PATENT DOCUMENTS

| | | | |
|---|---|---|---|
| 6,658,136 | B1 | 12/2003 | Brumitt |
| 7,221,366 | B2* | 5/2007 | Uyttendaele .......... G06T 15/205 345/427 |
| 8,704,879 | B1 | 4/2014 | Cheng et al. |
| 8,797,321 | B1 | 8/2014 | Bertolami et al. |
| 2002/0163519 | A1 | 11/2002 | Kitsutaka |
| 2004/0156631 | A1 | 8/2004 | Redert et al. |
| 2006/0119599 | A1* | 6/2006 | Woodbury .............. G06T 15/04 345/420 |
| 2007/0296721 | A1 | 12/2007 | Chang et al. |
| 2009/0116732 | A1 | 5/2009 | Zhou et al. |
| 2009/0244309 | A1* | 10/2009 | Maison .............. G06K 9/00369 348/222.1 |
| 2010/0134495 | A1 | 6/2010 | Matsui |
| 2010/0162092 | A1 | 6/2010 | Albu et al. |
| 2011/0074778 | A1 | 3/2011 | Turner et al. |
| 2011/0080463 | A1* | 4/2011 | Endo ..................... G06T 7/0022 348/42 |
| 2011/0122131 | A1 | 5/2011 | Bruls et al. |
| 2011/0141319 | A1* | 6/2011 | Watazawa .......... H04N 5/23219 348/240.2 |
| 2011/0254841 | A1 | 10/2011 | Lim et al. |
| 2012/0139906 | A1 | 6/2012 | Zhang et al. |
| 2012/0148147 | A1* | 6/2012 | Ogata ................ H04N 13/0022 382/154 |
| 2012/0162372 | A1* | 6/2012 | Ghyme ................ H04N 13/004 348/46 |
| 2013/0050187 | A1 | 2/2013 | Korcsok et al. |
| 2013/0071009 | A1 | 3/2013 | Ha |

OTHER PUBLICATIONS

British Search and Exmaination Report for Application No. GB 1220219 dated May 1, 2013.
British Search and Examination Report for Application No. GB1303301.4 dated Aug. 9, 2013.
British Search and Examination Report for Application No. GB1303299 dated Aug. 27, 2013.
British Seach and Examination Report for Application No. 1303315.5 dated Aug. 16, 2013.
Beymer D et al: "Eye gaze tracking using an active stereo head", Proceedings / 2003 IEEE Computer Society Conference on Computer Vision and Pattern Recognition, 18 ? Jun. 20, 2003, Madison, Wisconsin; [Proceedings of the IEEE Computer Conference on Computer Vision and Pattern Recognition], Los Alamitos, Calif. [U.A, vol. 2, Jun. 18, 2003, pp. 451?458, XP01064470.
Exendend European Search Report for Application No. 13189699.5 dated Januray 30, 2014.
Extended European Search Report for Application No. 13189707.6 dated Feb. 5, 2014.
Hoppe H: "Progressive Meshes", Computer Graphics Proceedings, SIGGRAPH 196, ACM, New York, US, Jan. 1, 1996, pp. 100-102, XP008107612.
PlayStation: "EyePet Move E3 Trailer", you tube, Jun. 14, 2010, XP054975297, Retrieved from the Internet: URL: http://www.youtube.com/watch?v=TztCY2iz450, retrieved on Jan. 21, 2014.
Sugita K: "VR Object Composition Method Using Stereo Vision", Advanced Information Networking and Applications, 2006. AINA 2006. 20th International Conference on Vienna, Austria Apr. 18-20, 2006, Piscataway, NJ, USA, IEEE, vol. 2, Apr. 18, 2006, pp. 683-687, XP010915442.
Sung-Yeol Kim: "Depth Map Creation and Mesh-based Hierarchical 3-D Scene Representation in Hybrid Camera System", 2008, Department of Informatiom and Communications School of Information and Mechatronics, Gwangju Institute of Science and Technology, XP002719287, pp. 1-137.
Waschbusch et al: "Point-sampled 3D video of real-world scenes", 9-13 Signal Processing. Image Communication, Elsevier Science Publishers, Amsterdam, NL, vol. 22, No. 2, Mar. 16, 2007, pp. 203-216, XP005938669.
Izadi, Shahram, et al. "KinectFusion: real-time 30 reconstruction and interaction using a moving depth camera." Proceedings of the 24th annual ACM symposium on User interface software and technology. ACM, 2011.
Yu, Yizhou, et al. "Mesh editing with poisson-based gradient field manipulation." ACM Transactions on Graphics (TOG) 23.3 (2004): 644-651.
Loscos, Celine, George Drettakis, and Luc Robert. "Interactive virtual relighting of real scenes." Visualization and Computer Graphics, IEEE Transactions on 6.4 (2000): 289-305.

* cited by examiner

SYSTEM AND METHOD OF IMAGE RECONSTRUCTION

CROSS REFERENCE TO RELATED APPLICATIONS

The present application claims the benefit of and priority to GB Application No. 1220219.8, filed Nov. 9, 2012, the entire disclosure of which is incorporated by reference herein.

BACKGROUND OF THE INVENTION

1. Field of the Invention

The present invention relates to a system and method of image reconstruction.

2. Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Many videogame consoles now have the option to use video cameras as a form of input, such as the PlayStation Eye® and the Microsoft Kinect®. Meanwhile, some consoles now also have the facility to generate 3D outputs for use with 3D televisions. It would be preferable if these 3D enabled consoles could also use 3D video inputs of the player, from a stereoscopic camera.

In addition to providing stereo images that may be integrated into a 3D videogame display, the coupling of a stereoscopic camera to a videogame console also provides additional information about the user's environment that may be of use for such integration or may provide information or constraints relevant to a videogame.

For example, by estimating the positions of the walls in a user's room, virtual objects in the display can be made to act in a manner consistent with the extent of that room, and/or the actions required by the user to play the game can be anticipated and the game adjusted, to ensure that the player is not required to move through a wall or item of furniture to achieve a goal.

To do this however, it is preferable to improve the fidelity of the estimations made, wherever possible.

The present invention seeks to address or mitigate this need.

SUMMARY OF THE INVENTION

In a first aspect, a method of image reconstruction is provided in accordance with claim 1.

In another aspect, an entertainment device for image reconstruction is provided in accordance with claim 13.

Further respective aspects and features of the invention are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A system and method of image reconstruction are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
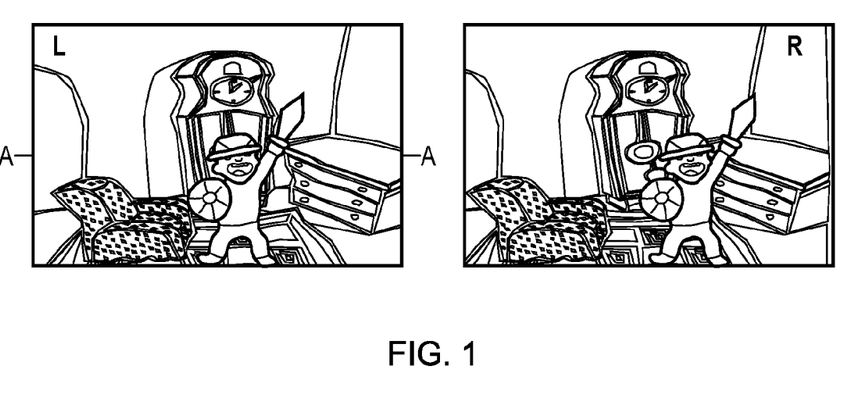
FIG. 1 is a schematic diagram of a stereoscopic pair of images.

Referring now to FIG. 1, this shows an example stereoscopic pair of images such as may be captured by a 3D video camera attached to a console. In the left and right images (denoted R and L in the figure), a child is performing actions in their living room in response to a video game, and in each image a different viewpoint on the scene is captured.

However, it will be appreciated that a small area of the room behind the child is not seen in either image, and similarly there are sections of the room behind the chair that are obscured. In order to potentially digitally recreate the room (for example to insert monsters to battle, or to rotate the room on screen to reveal treasure), it would be desirable to fill in the missing areas within a digital model of the room.

Hence in an embodiment of the present invention, as a preparatory step the left and right images can be rectified to line up vertically.

Next, a disparity map is generated, using one of several known techniques. A disparity map indicates the horizontal disparity between corresponding pixels in each image. Most techniques rely on some form of localised cross-correlation between regions of the two images, but any suitable technique may be used.

The disparity map is an indirect indicator of distance between the 3D video camera and a surface depicted in the image. For a pair of parallel aligned video cameras in a 3D video camera, it will be appreciated that the parallel lines converge at infinity and so at that distance there would be no disparity. Meanwhile an object very close to the cameras would show significant horizontal disparity. Hence the degree of disparity corresponds to the distance of the pixel from the camera.

Meanwhile, a small object very close to the cameras may in fact not properly appear in both images, and so the stereo disparity also effectively imposes an operational near-distance limit on the stereoscopic effect.

However, for objects within the operational region of the device, the disparity between these objects in the two images can be related to their relative depth from the camera.

To generate a digital model of the scene one may calculate the depth information or 'z' value at each x, y point in the disparity map to create a notional point-cloud of x,y,z positions, and then define a mesh describing the room by, for example, Delaunay triangulation of the calculated (x,y,z) points or a subsample thereof.

Figure 2:
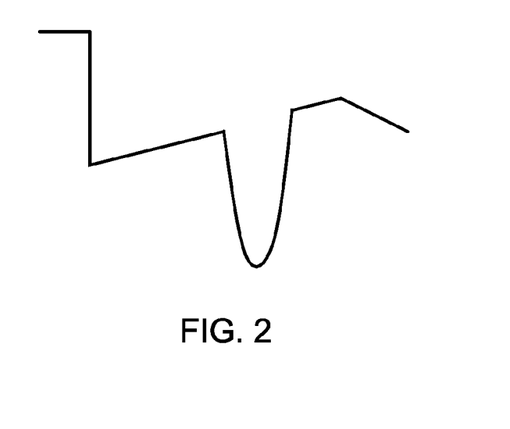
FIG. 2 is a schematic plan view of a portion of a mesh generated from the stereoscopic pair of images.

Using the line A-A in FIG. 1 as an example, then FIG. 2 illustrates a plan view of a slice through a mesh at a corresponding line in the digital model. FIG. 2 is shown aligned with one of the images from FIG. 1 for ease of understanding. It can be seen that the depth of the mesh on the left side is effectively infinite (or at a maximum depth), corresponding to the doorway out of the room. The mesh then generally maps along the wall. However, there is a clear error where the images show the child. The problem is that a simple triangulation of the points in the disparity map will create a mesh that incorrectly treats isolated near-field objects as solid projections from the background. Hence in FIG. 2, the (x,y,z) points corresponding to the child's head are interpreted as a projection forwards from the adjacent (x,y,z) points corresponding to the wall of the room. This is clearly wrong.

To address this, in an embodiment of the present invention, the generation of such a mesh is performed in a plurality of N stages or layers. These layers are defined as follows.

The minimum disparity in the image, corresponding to the furthest distance, is denoted dispMin.

The maximum disparity (or the maximum valid disparity, if a cut-off is being applied) is denoted dispMax.

Then, dispPerLayer=(dispMax−DispMin)/N.

dispPerLayer defines a disparity range for successive analysis layers of the disparity map. Hence a first layer encompasses a start point dispMin to an end point (dispMin+dispPerLayer)−1, and a second layer encompasses a start point (dispMin+dispPerLayer) to an end point (dispMin+(2×dispPerLayer)−1), and so on. In this embodiment, the layers do not overlap.

It will be appreciated that since there is typically a non-linear relationship between disparity and physical distance, then similarly the calculated distance may be divided equally by N, and the corresponding disparity ranges identified for each of the resulting N layers.

In either case however, it will be understood that each successive layer represents a slice of the disparity map in the z-axis having thickness dispPerLayer, progressing from the most distant elements in the map forwards.

Figure 3A:
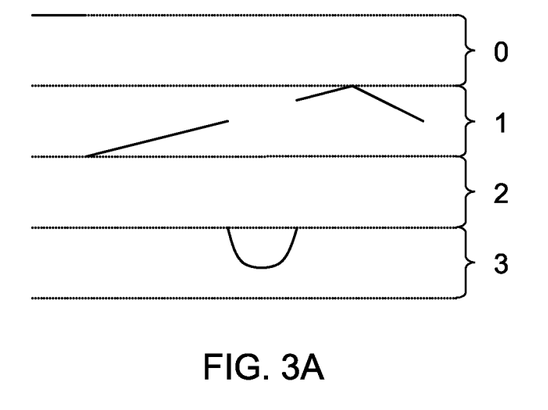
FIGS. 3A to 3C are schematic plan views of a sequence of meshes generated from the stereoscopic pair of images in accordance with an embodiment of the present invention.
Figure 3B:
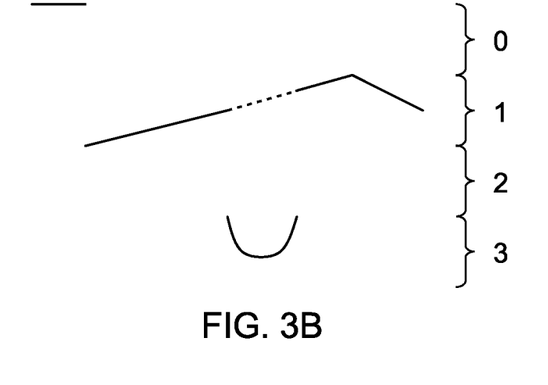
Figure 3C:
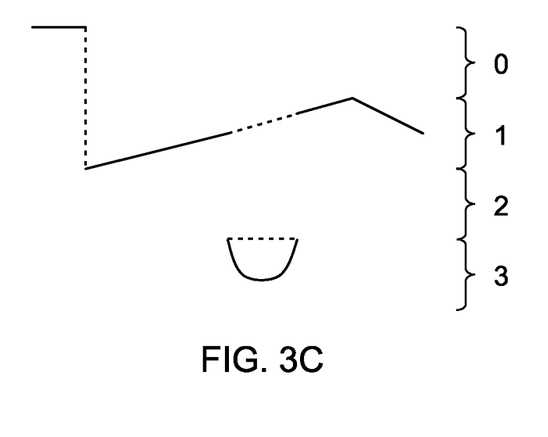

Referring now to FIGS. 3A to 3C, these illustrate a mesh generation process with (as a non-limiting example) 4 such layers, labelled 0 to 3 in FIG. 3A.

Starting with layer 0, only the disparity or depth values within the range of this layer are considered. For processing efficiency, this may be achieved by copying only the points of the disparity map within this range to a temporary disparity map, which is then subject to a meshing process such as the Delaunay triangulation process referred to above. In this case the remaining points in the temporary disparity map are treated as invalid or empty points as appropriate.

Hence in layer 0, only the depth information corresponding to the doorway in the scene of FIG. 1 is present. A mesh based on these actual (x,y,z) points (shown with a solid line in FIG. 3B) is created for layer 0.

Next, for layer 1, a mesh based on the actual (x,y,z) points is shown with a solid line in FIG. 3B. Notably, due to the layering process described above, the mesh for this layer is generated as if the child was not in the room at all. Consequently the region of (x,y,z) points missing due to their occlusion by the child in the captured stereo image are interpolated in a manner consistent with the actual (x,y,z) points in this layer, and may be treated automatically by a Delaunay algorithm as a region of the point cloud with sparse samples. The interpolated section of the mesh is shown in FIG. 3B with dotted lines.

In this example layer 2 does not encompass any disparity values.

For layer 3, again a mesh based on the actual (x,y,z) points in this layer is generated. In this case, these correspond to the foreground object, which is the child.

The resulting meshes are then merged to form a single composite digital model of the scene.

Several optional rules may be implemented at this point to provide a good overall result, including one or more selected from the list consisting of:

Firstly, where the meshes of two layers terminate but have terminal x, y and z positions within a threshold distance of each other, then these meshes may be joined. Optionally for layers 0 and 1 the restriction on the z position may be relaxed, since layer 0 may reach to infinity. Hence for example the mesh of layer 0 may still be joined to the mesh of layer 1, as shown by the dotted line in FIG. 3C, because they have adjoining x, y values.

Secondly, where two meshes overlap, duplicate polygons at the same positions (or within a predetermined tolerance) are deleted.

Thirdly, where a polygon in a mesh covers a small distance in the x,y plane, but a large distance along the z axis (as defined by predetermined thresholds) then that polygon may be deleted. Put another way, polygons in a layer mesh having a predetermined angle close to the normal to the image plane, or close to parallel to the line of sight of the camera, may be removed.

Fourthly, where the meshes of two layers occupy similar x, y positions but not similar z positions as defined by a predetermined threshold, then it can be assumed that the meshes represent discrete objects, as in the child and the wall in the present example. In this case, the foreground mesh may optionally be closed (represented by the dotted line on the mesh corresponding to the child in FIG. 3C).

Finally, during creation of the mesh at each layer, optionally a rule may be implemented to suppress interpolation of the mesh for points more than a predetermined distance apart, where the distance is a function of the layer number. Optionally this rule may only be enacted after a predetermined proportion of layers have been meshed, such as 50% or 75%. The purpose of this rule is to prevent or reduce erroneous interpolation of a mesh between two people standing in the same foreground layer.

It will be appreciated that typically the object causing the most relevant occlusions will be the one or more people interacting with the console. Consequently for example the console may use face recognition to identify a plurality of users in the images and their corresponding depth positions in the disparity map, and select N or modify the layer ranges to ensure that they are meshed in a separate layer from the background and preferably also from each other. More generally, the console may select a value of N responsive to the maximum distance or minimum disparity value so that each layer is of a thickness (or has a point population)

sufficient to build a reasonable mesh. In general, the higher the value of N (i.e. the more layers used), the better the end result.

Where two people are in the same layer, knowledge that they are people can also be used to constrain mesh generation, treating them as a special case and possibly using different mesh generation rules based upon for example skeletal modelling. Interpolation between identified people can also therefore be suppressed in this way.

It will be appreciated that the layers in the embodiment described above are non-overlapping. However, referring now to FIGS. 4A to 4C, in an alternative embodiment the layers are defined as follows; the first layer 0' encompasses start point dispMin to end point (dispMin+dispPerLayer), the second layer 1' encompasses start point dispMin to end point (dispMin+(2×dispPerLayer)), and the third layer 2' encompasses start point dispMin to end point (dispMin+(3×dispPerLayer)), and so on. That is to say, the layers overlap, getting progressively deeper to encompass more of the disparity map each time. In the example above where N=4, then the final layer 3' encompassing start point dispMin to end point (dispMin+(4×dispPerLayer)) includes all the points in the disparity map, like the conventional mesh described previously and illustrated in FIG. 2. The individual meshes can follow similar rules to those described in the previous embodiment, such as suppressing interpolation for high disparity points, and/or limiting interpolation (or using different meshing techniques) for identified people in the images.

Figure 4A:
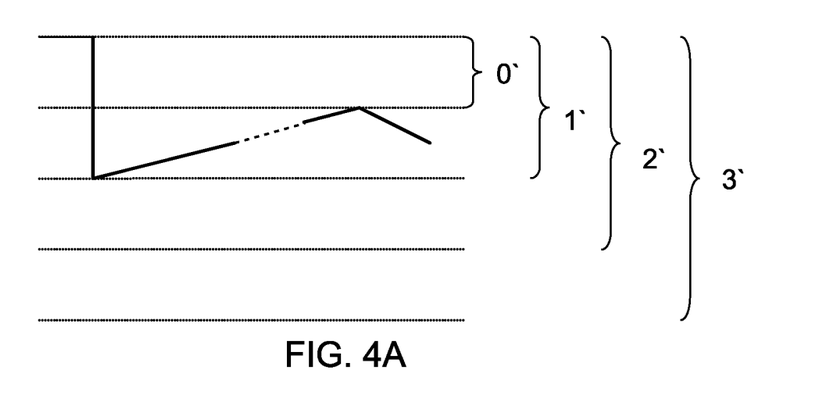
FIGS. 4A to 4C are schematic plan views of a sequence of meshes generated from the stereoscopic pair of images in accordance with an embodiment of the present invention.
Figure 4B:
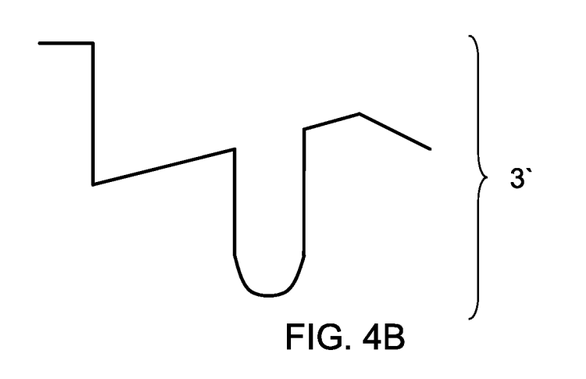

FIG. 4A illustrates the mesh generated for layer 1'. FIG. 4B illustrates the mesh generated for layer 3'.

As in the previous embodiment, the meshes are merged successively. Hence the mesh of layer 1' is merged with the mesh of layer 0' to generate a first merged mesh. Then the mesh of layer 2' is merged with the first merged mesh to generate a second merged mesh. Then the mesh of layer 3' is merged with the second merged mesh to generate a third merged mesh. This process can be implemented as new layer meshes are generated, or once all layer meshes have been generated.

Again, during the merging process duplicate polygons from different meshes that substantially overlap are deleted, preferably preserving the polygon generated in the mesh of the thinner layer. Again, where a polygon in a mesh layer covers a small distance in the x,y plane, but a large distance on the z-axis (as defined by predetermined thresholds) then that polygon is deleted, in other words where the polygon is, within a predetermined tolerance, on the z-plane, or parallel to the line of sight of the cameras, or substantially normal to the image plane, then it is deleted. This latter step for example effectively removes the connection between foreground objects and background objects in the meshes of the thicker layers.

Figure 4C:
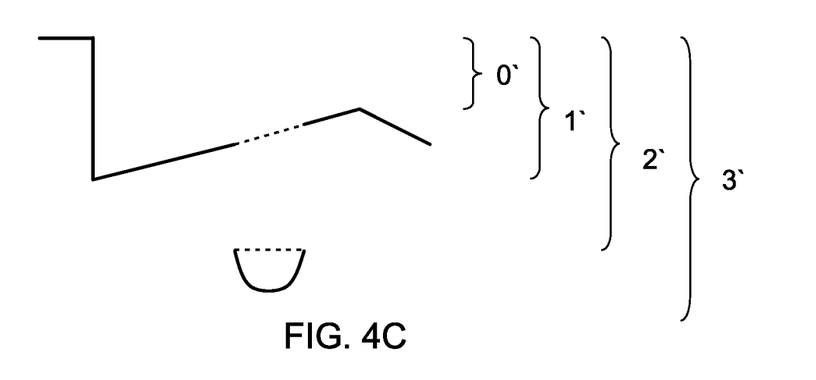

FIG. 4C illustrates the merged meshes in the present example. Here, the left-most section of the mesh corresponds to the mesh generated for layer 0', which was overlapped by each successive mesh and so the duplicate polygons were deleted. The section of the mesh corresponding to the wall was generated for layer 1', with the interpolated section of the mesh for the wall shown as a dotted line. The duplicate polygons for the wall also generated for layers 2' and 3' would have been deleted. Finally, the mesh for the child was generated for layer 3'. However the polygons that were nearly normal to the image plane (having a small x-y distance and a large z distance) have been deleted, separating the child from the wall. As in the previous embodiment, optionally the mesh corresponding to the child has been closed, denoted by the dotted line on the part of the mesh corresponding to the child.

Hence the present invention may operate using a series of either overlapping or non-overlapping layers, successively moving forward along the z axis. For non-overlapping layers, logic relating to linking meshes for surfaces that pass through the layer interfaces will be more significant, whilst for overlapping layers, logic relating to identifying and deleting duplicate polygons will be more significant.

Figure 5A:
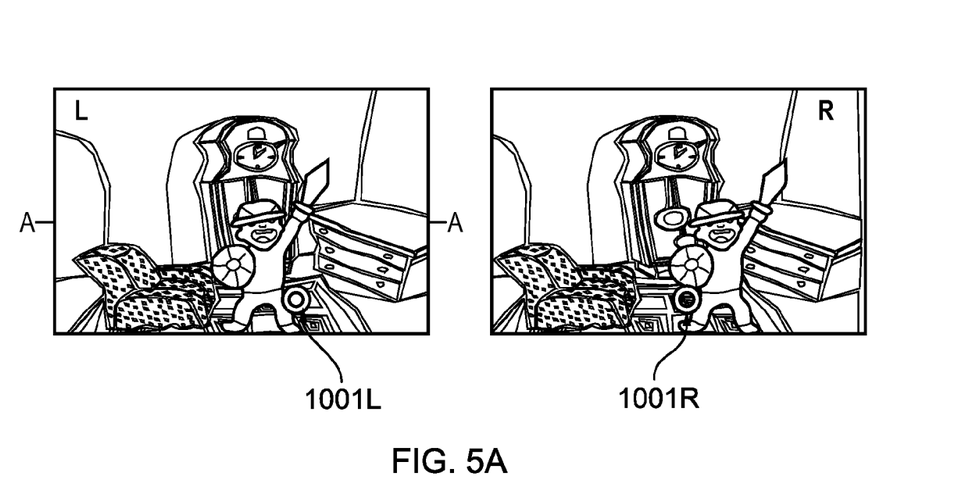
FIG. 5A is a schematic diagram of a stereoscopic pair of images, indicating colour samples.
Figure 5B:
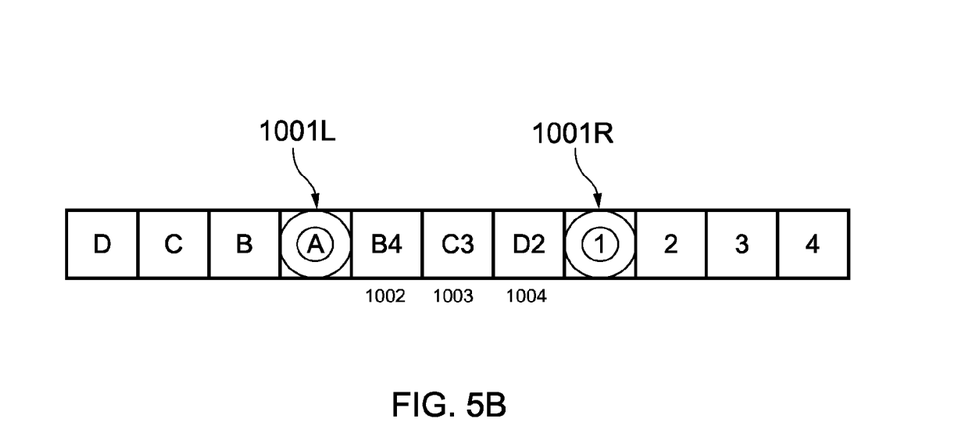
FIG. 5B is a schematic diagram of a texture to be interpolated in accordance with an embodiment of the present invention.

Turning now to FIGS. 5A and 5B, in addition to the generation of the mesh for the digital model of the scene, it is also desirable to generate textures to apply to the mesh.

Referring to FIG. 5A, by way of example, the circled points in the figure show different sections of a carpet or rug. In a colour rendition of the image, the point $1001L$ is a salmon pink, whilst $1001R$ is a beige and green mix. However, the interface between these two sections of the rug is obscured by the child in both images.

Consequently, texture interpolation between two points $1001L$ and $1001R$ may be performed for the corresponding section of the mesh model as follows.

In FIG. 5B, the two pixel positions $1001L$ and $1001R$ have colour values 'A' and '1' respectively, denoting the arbitrary colour values at those positions in the current images. In the texture to be applied to the mesh, three intervening pixels $1002$, $1003$, $1004$ are undefined.

To interpolate the colour values of these pixels, in an embodiment of the present invention the colour values 'A' and '1' corresponding to positions $1001L$ and $1001R$ are not used.

Instead, colour values of neighbouring pixels positioned away from the undefined pixels are used.

This is because in the image, the missing pixels are obscured by an unrelated foreground object (the child) and for the pixels immediately adjacent to this object in the images there is a significant risk that the pixel colour at positions $1001L$ and $1001R$ is in fact already a combination of the colour of the foreground and background objects, due to the per-pixel colour sampling in the CCDs of the video camera source. Rather than propagate this tainted colour across the undefined pixels, it is assumed that neighbouring pixels further from the foreground object may be more representative of the true background colour.

Hence in an embodiment of the present invention, the three interpolated pixels may therefore take the following values:

$1002$—75% 'B', 25% '2'
$1003$—50% 'B', 50% '2'
$1004$—25% 'B', 75% '2'.

This provides a uniform transition between the colours 'B' and '2' sampled one pixel adjacent to positions $1001L$ and R.

Alternatively, successively distant neighbouring pixels may be used. The purpose of this is to preserve the existing variability of the texture as well as to blend the colours. In a transient image, this will make the interpolation less obvious as the spatial frequencies in the interpolated section will now be similar to those in the surrounding texture.

Hence in this embodiment, the three interpolated pixels may take the following values:

$1002$—75% 'B', 25% '4'
$1003$—50% 'C', 50% '3'
$1004$—25% 'D', 75% '2'.

The polygon mesh and the texture(s) may then be rendered and displayed on screen. For the same viewpoint as the original camera, the resulting render is likely to look nearly identical to the original image, as only mesh based on actual (x,y,z) points and texture from visible image data will be used. However, as the virtual viewpoint is moved, for example as part of a game play mechanic, then elements of the scene that have been interpolated become visible.

A suitable device for carrying out the above techniques and variants under suitable software instruction include but are not limited to the Sony® PlayStation 3® and PS Vita®.

Figure 6:
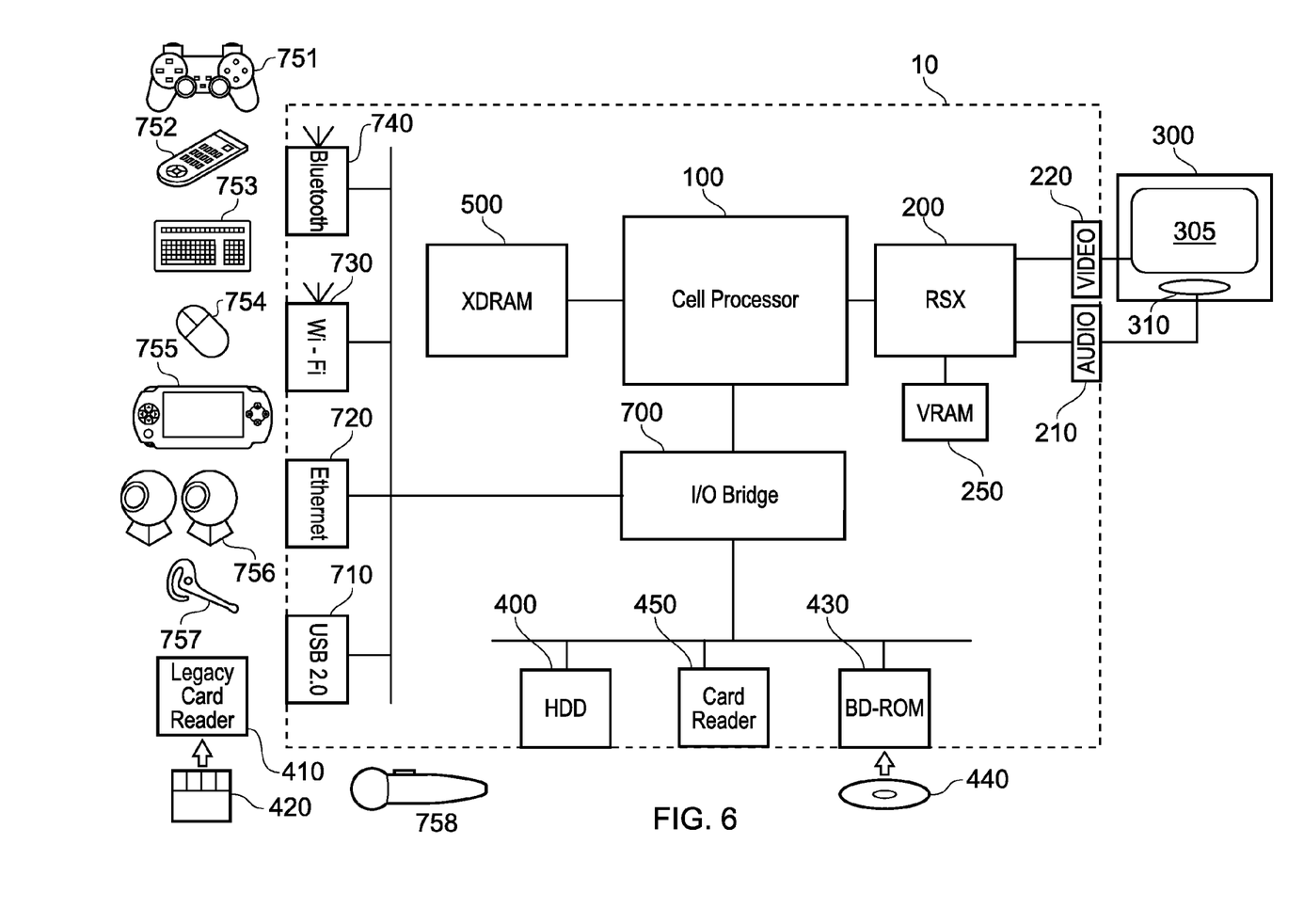
FIG. 6 is a schematic diagram of an entertainment device in accordance with an embodiment of the present invention.

By way of example, FIG. 6 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi®) port 730; and a Bluetooth® wireless link port 740 capable of supporting up to seven Bluetooth® connections.

In operation the I/O bridge 700 handles all wireless, USB and Ethernet data, including data from one or more game controllers 751. For example when a user is playing a game, the I/O bridge 700 receives data from the game controller 751 via a Bluetooth® link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a 'Sony Playstation Portable' ® entertainment device; a video camera such as a stereoscopic version of the 'PlayStation Eye' ® video camera 756; and a microphone headset 757. Such peripheral devices may therefore in principle be connected to the system unit 10 wirelessly; for example the portable entertainment device 755 may communicate via a Wi-Fi® ad-hoc connection, whilst the microphone headset 757 may communicate via a Bluetooth® link.

The provision of these interfaces means that the Playstation 3® device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

The game controller 751 is operable to communicate wirelessly with the system unit 10 via the Bluetooth® link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the portable entertainment device 755 or the 'Playstation Move' ® 758 may be used as a controller. In the case of the portable entertainment device, additional game or control information (for example, control instructions or number of lives) may be provided on the screen of the device. In the case of the Playstation Move®, control information may be provided both by internal motion sensors and by video monitoring of the light on the Playstation Move® device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth® link. The remote control 752 comprises controls suitable for the operation of the Blu Ray® Disk BD-ROM reader 430 and for the navigation of disk content.

The Blu Ray® Disk BD-ROM reader 430 is operable to read CD-ROMs compatible with the Playstation and Playstation 2 devices, in addition to conventional pre-recorded and recordable CDs, and so-called Super Audio CDs. The reader 430 is also operable to read DVD-ROMs compatible with the Playstation 2® and PlayStation 3® devices, in addition to conventional pre-recorded and recordable DVDs. The reader 430 is further operable to read BD-ROMs compatible with the Playstation 3® device, as well as conventional pre-recorded and recordable Blu-Ray® Disks.

The system unit 10 is operable to supply audio and video, either generated or decoded by the Playstation 3® device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3® device's operating system supports Dolby® 5.1 surround sound, Dolby® Theatre Surround (DTS), and the decoding of 7.1 surround sound from Blu-Ray® disks.

In the present embodiment, the stereoscopic video camera 756 comprises a pair of charge coupled devices (CCDs) with respective optics, an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the stereoscopic video camera 756 may variously connect to the system unit 10 via a USB, Bluetooth or Wi-Fi® communication port. Embodiments of the video camera may include one or more associated microphones and are also capable of transmitting audio data. In embodiments of the video camera, the CCDs may have a resolution suitable for high-definition video capture. In use, images captured by the video camera may for example be incorporated within a game or interpreted as game control inputs.

In general, in order for successful data communication to occur with a peripheral device such as a stereoscopic video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 7:
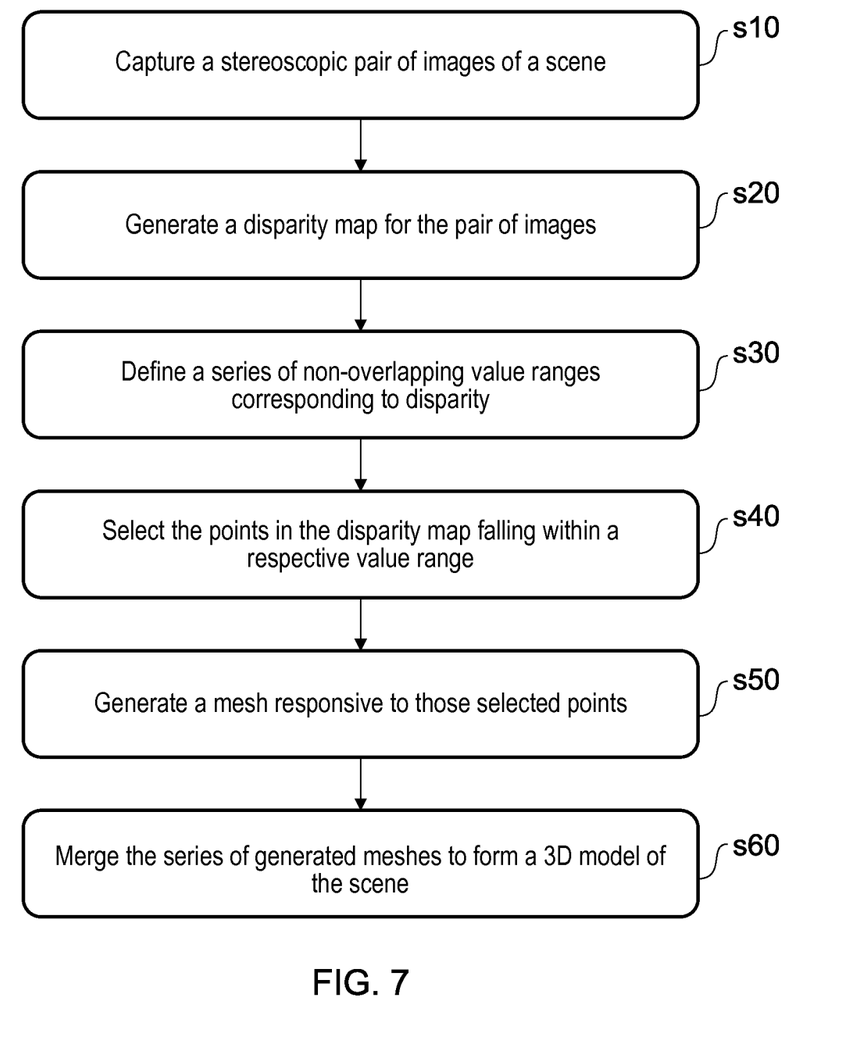
FIG. 7 is a flow diagram of a method of image reconstruction in accordance with an embodiment of the present invention.

Referring now to FIG. 7, in a summary embodiment of the present invention, a method of image reconstruction comprises in a first step s10, capturing a stereoscopic pair of images of a scene; in a second step s20, generating a disparity map for the pair of images; and in a third step s30, defining a series of value ranges corresponding to disparity, each value range in the series having an end point corresponding to a greater disparity than an end point of preceding value ranges in the series (notably this is true for both overlapping and non-overlapping embodiments of the layers). Then for each value range in the series, and progressing in order through the series from the first value range in the series (i.e. in the order layer 0, 1, 2, 3 as shown in the examples herein), in a fourth step s40, selecting the points in the disparity map falling within the respective value range; and in a fifth step s50, generating a mesh responsive to those selected points. Subsequently in a sixth step s60, the series of generated meshes are merged to form a 3D model of the scene.

In an instance of the summary embodiment, the method comprises the steps of detecting the minimum disparity 'dispMin' in the disparity map, detecting the maximum allowed disparity 'dispMax' in the disparity map, and defining a plurality of N value ranges between dispMin and dispMax. As described previously, the extent of each value range can be equal to (dispMax−dispMin)/N for non-overlapping layers, or P times (dispMax−dispMin)/N for overlapping layers of increasing thickness, where P is the series number of the respective value range and 1≤P≤N. It will be appreciated that this expression replicates the outcome of the example found previously herein, but for simplicity uses a layer naming convention 1 to N rather than 0 to N−1.

In an instance of the summary embodiment, the method comprises the steps of detecting one or more faces in at least one of the stereoscopic pair of images, detecting a corresponding disparity value of the or each face, and selecting N so that the disparity value of the or each face is in a value range other than that comprising dispMin. More generally, the layers can be selected so that the or each face is in a layer other than the layer containing the majority of the background surrounding the face.

In an instance of the summary embodiment, the step of generating a mesh responsive to the selected points in the disparity map falling within a respective value range in turn comprises the step of interpolating the mesh between the selected points within the respective value range. This can be restricted to a predetermined value range or ranges in the series of value ranges, and/or a limit on the size of gap to be interpolated can be imposed as a function of the position of the value range in the series of value ranges, as described previously.

In an instance of the summary embodiment, the step of merging the series of generated meshes can comprise one or more selected from the list consisting of:

i. joining meshes that terminate within a predetermined distance of each other;

ii. deleting a duplicate mesh polygon that is substantially collocated with a mesh polygon of a more distant layer;

iii. deleting mesh polygons that are substantially normal to the image plane;

iv. closing meshes that have similar planar positions to more distant meshes but are separated by a predetermined depth from those more distant meshes.

In an instance of the summary embodiment, the method comprises the step of generating one or more textures to apply to respective meshes in the 3D model of the scene, which in turn comprises the steps of detecting a contiguous line of one or more undefined texture pixels for which no corresponding colour data is available in the stereoscopic pair of images due to occlusion by foreground objects, detecting first defined pixels adjacent to each side of the line of undefined texture pixels, detecting further defined pixels adjacent to the first pixels, and updating the undefined texture pixels with interpolated values responsive to the further defined pixels. The further defined pixels on each side of the line of undefined texture pixels can comprise a sequence of further pixels, and successive corresponding pixels in the sequence on each side are interpolated to update the undefined texture pixels.

Finally, in an instance of the summary embodiment, the method comprises the step of rendering the 3D model of the scene using the or each generated texture respectively applied to the or each mesh in the 3D model.

Meanwhile, in the summary embodiment of the present invention, an entertainment device for image reconstruction, such as the PS3® 10 or PS Vita® comprises an input operable to receive a stereoscopic pair of captured images of a scene, such as the Bluetooth® 740, WiFi® 730 or USB 710 ports of the PS3®, a processor (such as the Cell processor 100, either operating by itself or in conjunction with the RSX 200) operable to generate a disparity map for the pair of images and to define a series of value ranges corresponding to disparity, each value range in the series having an end point corresponding to a greater disparity than an end point of preceding value ranges in the series, the processor being operable, for each value range in the series, and progressing in order through the series from the first value range in the series, to select the points in the disparity map falling within the respective value range, and generate a mesh responsive to those selected points, the processor being operable to subsequently merge the series of generated meshes to form a 3D model of the scene.

In an instance of the summary embodiment, the entertainment device comprises a processor (again the Cell 100 and/or RSX 200 processors) operable to generate one or more textures to apply to respective meshes in the 3D model of the scene, the processor being operable to detect a contiguous line of one or more undefined texture pixels for which no corresponding colour data is available in the stereoscopic pair of images due to occlusion by foreground objects, detect first defined pixels adjacent to each side of the line of undefined texture pixels, detect further defined pixels adjacent to the first pixels, and update the undefined texture pixels with interpolated values responsive to the further defined pixels.

Finally, in an instance of the summary embodiment, the entertainment device comprises rendering means (e.g. the RSX 200 processor, either operating alone or in conjunction with the Cell processor 100) operable to render the 3D model of the scene using the or each generated texture respectively applied to the or each mesh in the 3D model.

It will be appreciated that the methods disclosed herein may be carried out on conventional hardware suitably adapted as applicable by software instruction or by the inclusion or substitution of dedicated hardware, such as the Sony PS Vita® or the PS3® described above.

Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, if applicable the computer program may take the form of a transmission via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of image reconstruction, comprising the steps of:
    capturing a stereoscopic pair of images of a scene;
    generating, by one or more processors, a disparity map for the pair of images;
    defining a series of value ranges corresponding to disparity, each value range in the series having an end point corresponding to a greater disparity than an end point of preceding value ranges in the series;
    for each value range in the series, and progressing in order through the series from the first value range in the series,
        selecting points in the disparity map falling within the respective value range; and
        generating, by the one or more processors, a mesh responsive to those selected points,
    and subsequently merging the generated meshes to form a 3D model of the scene.

2. A method of image reconstruction according to claim 1, comprising the steps of:
    detecting a minimum disparity 'dispMin' in the disparity map;
    detecting a maximum allowed disparity 'dispMax' in the disparity map; and
    defining a plurality of N value ranges between dispMin and dispMax.

3. A method of image reconstruction according to claim 2, in which an extent of each value range is equal to one selected from the list consisting of:
    i. (dispMax−dispMin) / N; and
    ii. P times (dispMax−dispMin) / N, where P is the series number of the respective value range, $1 \leq P \leq N$.

4. A method of image reconstruction according to claim 2, comprising the steps of:
    detecting one or more faces in at least one of the stereoscopic pair of images;
    detecting a corresponding disparity value of one or more of the faces; and
    selecting N so that the disparity value of the one or more faces is in a value range other than that comprising dispMin.

5. A method of image reconstruction according to claim 1, in which the step of generating a mesh responsive to the selected points in the disparity map falling within a respective value range in turn comprises the step of:
    interpolating the mesh between the selected points within the respective value range.

6. A method of image reconstruction according to claim 5, in which the step of interpolating the mesh is restricted to a predetermined value range or ranges in the series of value ranges.

7. A method of image reconstruction according to claim 5, in which the step of interpolating the mesh comprises a limit on the size of gap to be interpolated, as a function of the position of the value range in the series of value ranges.

8. A method of image reconstruction according to claim 1, in which the step of merging the generated meshes comprises one or more selected from the list consisting of:
    i. joining meshes that terminate within a predetermined distance of each other;
    ii. deleting a duplicate mesh polygon that is substantially collocated with a mesh polygon of a more distant layer;
    iii. deleting mesh polygons that are substantially normal to an image plane; and
    iv. closing meshes that have similar planar positions to more distant meshes but are separated by a predetermined depth from those more distant meshes.

9. A method of image reconstruction according to claim 1, comprising the step of:
    generating one or more textures to apply to respective meshes in the 3D model of the scene,
    and in which this step in turn comprises the steps of:
        detecting a contiguous line of one or more undefined texture pixels for which no corresponding colour data is available in the stereoscopic pair of images due to occlusion by foreground objects;
        detecting first defined pixels adjacent to each side of the line of undefined texture pixels;
        detecting further defined pixels adjacent to the first pixels; and
        updating the undefined texture pixels with interpolated values responsive to the further defined pixels.

10. A method of image reconstruction according to claim 9, in which the further defined pixels on each side of the line of undefined texture pixels comprise a sequence of further pixels, and successive corresponding pixels in the sequence on each side are interpolated to update the undefined texture pixels.

11. A method of image reconstruction according to claim 9, comprising the step of rendering the 3D model of the scene using one or more of the generated textures respectively applied to the or each mesh in the 3D model.

12. A non-transitory computer program product comprising computer readable instructions that when implemented by a computer cause it to perform a method comprising the steps of:
    capturing a stereoscopic pair of images of a scene;
    generating a disparity map for the pair of images;
    defining a series of value ranges corresponding to disparity, each value range in the series having an end point corresponding to a greater disparity than an end point of preceding value ranges in the series;
    for each value range in the series, and progressing in order through the series from the first value range in the series, selecting points in the disparity map falling within the respective value range; and generating a mesh responsive to those selected points, and subsequently merging the generated meshes to form a 3D model of the scene.

13. An entertainment device for image reconstruction, comprising:

an input operable to receive a stereoscopic pair of captured images of a scene;

a processor operable to generate a disparity map for the pair of images and to define a series of value ranges corresponding to disparity, each value range in the series having an end point corresponding to a greater disparity than an end point of preceding value ranges in the series;

the processor being operable, for each value range in the series, and progressing in order through the series from the first value range in the series, to select points in the disparity map falling within the respective value range; and generate a mesh responsive to those selected points, the processor being operable to subsequently merge the generated meshes to form a 3D model of the scene.

14. An entertainment device according to claim 13, comprising:

a second processor operable to generate one or more textures to apply to respective meshes in the 3D model of the scene, the second processor being operable to:

detect a contiguous line of one or more undefined texture pixels for which no corresponding colour data is available in the stereoscopic pair of images due to occlusion by foreground objects;

detect first defined pixels adjacent to each side of the line of undefined texture pixels;

detect further defined pixels adjacent to the first pixels; and update the undefined texture pixels with interpolated values responsive to the further defined pixels.

15. An entertainment device according to claim 14, comprising:

rendering means for rendering the 3D model of the scene using the or each generated texture respectively applied to the or each mesh in the 3D model.

* * * * *